April 28, 1931.  J. COTAL  1,802,630
SPEED INCREASING AND REDUCING APPARATUS
Filed Aug. 15, 1929    2 Sheets-Sheet 1
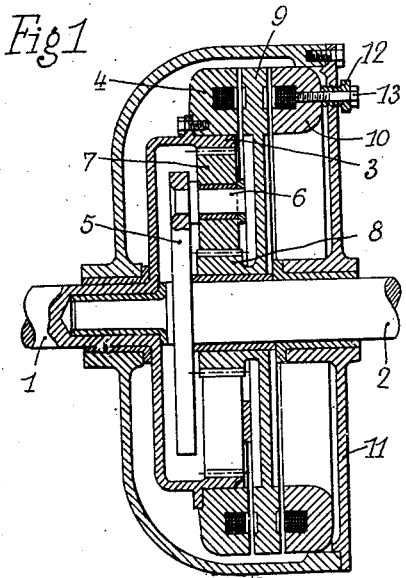
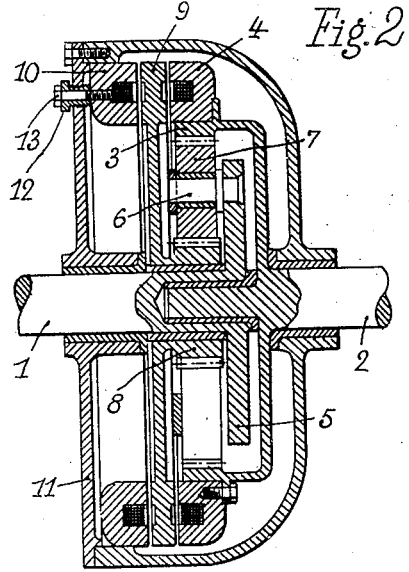
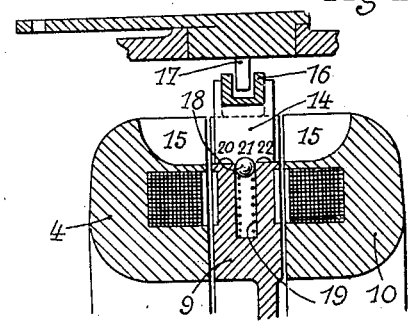
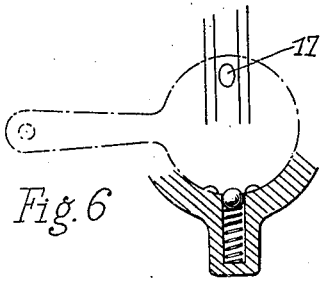
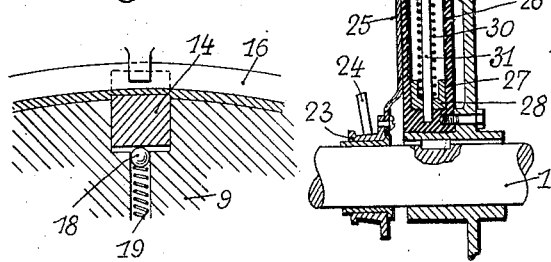
J. Cotal
INVENTOR
By Marks & Clerk
Attys.

April 28, 1931. J. COTAL 1,802,630
SPEED INCREASING AND REDUCING APPARATUS
Filed Aug. 15, 1929 2 Sheets-Sheet 2

Fig. 3

Patented Apr. 28, 1931

1,802,630

UNITED STATES PATENT OFFICE

JEAN COTAL, OF PARIS, FRANCE, ASSIGNOR TO SOCIETE D'EXPLOITATION DES BREVETS COTAL, OF PARIS, FRANCE

SPEED INCREASING AND REDUCING APPARATUS

Application filed August 15, 1929, Serial No. 386,157, and in France February 9, 1929.

In the case of machines or groups of machines in which the transmission of movement from the driving shaft to the actuated shaft requires the use of speed ratios which can be varied at will, the interposed mechanisms affording such speed variations comprise as a rule a suitable device for the direct connection between the driving shaft and the actuated shaft.

The said device is constructed in such manner as to provide for its frequent use, since it employs no intermediate gearing and is therefore noiseless, and its mechanical efficiency obviously exceeds that of all change-speed gear.

In the case of motor vehicles, the direct drive usually corresponds to the maximum speed, as this speed is employed as a general rule when on the road.

Since the intermediate gearing is inconvenient to operate and usually occasions a disagreeable noise, this leads the drivers of vehicles to avoid making changes of speed and to employ the direct drive to its utmost limits, but this is in fact subject to inconvenience.

In order to provide for an extensive use of the direct drive certain manufacturers have been led to increase the speed reduction on the rear axle, and others increase the number of cylinders of the engine as well as the cylinder contents.

However, in the first-mentioned case, when travelling on good roads, the engine must operate at an excessive rate in order to provide a high speed for the vehicle, and in the latter case, the torque of the engine is not used to its full extent and hence the engine will operate much below its maximum power, and its mechanical efficiency is thereby reduced.

The present invention relates to a device affording the direct drive of the actuated shaft or a speed reduction or increase, without undue effort and with a noiseless action.

The said invention provides for the use of planetary gearing and electro-magnets, as well as means for regulating the electro-magnets, and mechanical connecting means which may be substituted for the action of the latter, also automatic devices for breaking the circuit of the electro-magnets when the engine is stopped.

In the accompanying drawings which are given solely by way of example:

Fig. 1 is a diagrammatic section of a speed-reducing device, including a direct drive, according to the invention.

Fig. 2 is a diagrammatic section of a speed increasing device, including a direct drive.

Fig. 3 is a longitudinal section of a device which is adapted for speed increasing or reducing purposes, or for direct drive.

Figs. 4, 5 and 6 are diagrammatic views showing a device for the mechanical connection of the operative parts, for the obtainment of all desired combinations without the use of current.

Fig. 7 is a diagrammatic view of an automatic circuit-breaking device which is employed when the engine is stopped.

In Fig. 1 which shows a form of construction of a speed-reduction apparatus, 1 is a driving shaft and 2 an actuated shaft. The driving shaft carries an internal toothed ring 3 and a rotatable electro-magnet 4. The actuated shaft 2 is provided with a spider 5 comprising axles 6 symmetrically disposed about the centre. Upon said axles are loosely mounted planetary pinions 7 engaging the said internal toothed ring 3 and also engaging the central gear wheel 8 which is loosely rotatable on its shaft and is secured to a disk 9 adapted for magnetic adhesion to the rotatable electro-magnet 4 or to an electro-magnet 10 secured to the casing 11.

Suitable sockets 12 which can be screwed through the casing, make contact at the interior with the electro-magnet 10, and its distance from the said armature 9 can thus be regulated from the exterior; the electro-magnet 10 is secured to the sockets 12 by screws 13.

To operate the said apparatus for speed reduction, the current is sent into the stationary electro-magnet 10, thus holding the disk 9 and with it the central wheel 8. The internal toothed ring 3, which rotates at the speed of the engine, drives the planetary pinions 7 which bear upon the central wheel 8 and thus act upon the axles 6 of the spider 5, so that the latter will be driven as well as the shaft 2 secured thereto, in the same direction as the engine, but at a lower speed.

To provide for the direct drive, the circuit of the electro-magnet 10 is broken, and the current is sent into the rotatable electro-magnet 4, and the latter, by means of the disk 9, secures the central wheel 8 to the driving shaft 1. The planetary pinions 7 are thus driven at the speed of the engine; they will not rotate on their axes, and they drive by means of said axles the spider 5 and the shaft 2 at the speed of the engine.

Fig. 2 shows a form of the speed-increasing device whose construction is analogous to that of the speed-reducing apparatus Fig. 1, but herein the internal toothed ring 3 and the rotatable electro-magnet 4 are secured to the actuated shaft 2, the spider 5 being mounted on the driving shaft 1.

To obtain a speed greater than that of the direct drive, the current is sent into the stationary electro-magnet 10 which now holds the disk 9 and the central wheel 8 in the fixed position. The planetary pinions 7 are driven by the spider 5 secured to the driving shaft and hence bear upon the central wheel 8, and drive the internal toothed ring 3 and thus the actuated shaft 2 in the same direction as the engine shaft but at a higher speed.

To obtain the direct drive, the current is sent into the rotatable electro-magnet 4, which connects together the central wheel 8 and the actuated shaft 2. The planetary pinions 7 are thus secured by their teeth on both sides, to the actuated shaft 2; they cannot rotate, and by means of their axles 6 and the spider 5 they secure the driving shaft 1 to the actuated shaft 2, and hence the latter will be operated on direct drive at the speed of the engine.

It should be observed that in the example shown in Figures 1 and 2, the same results will be obtained if the wheel 8, instead of being secured to the shaft carrying the internal toothed ring, is secured to the other shaft. If in the example shown in Fig. 2 the electro-magnet 10 is not stationary but is rotated in a rigid manner by the shaft 1, and if the electro-magnet 4 is secured to the casing, the conditions are not changed when the stationary electro-magnet 4 is energized, since the wheel 8 will be held fast as in the preceding case. When the electro-magnet 10 is energized, the disk 9 and the wheel 8 will be driven by the shaft 1 at the same speed as the disk 5 and the planetary pinions 7, and hence these latter will not rotate upon the wheel 8 but will drive the wheel 3 and the shaft 2 in a rigid manner, thus obtaining the direct drive.

Fig. 3 shows a combination of a speed-reducing device and a speed-increasing device whose construction is analogous to those above described, and in which the gear ratios permit the two sets of planetary pinions to use preferably a common internal toothed ring.

The driving shaft 1 and the actuated shaft 2 each carry a respective spider 5 and $5^a$ on whose axles 6 and $6^a$ are mounted the respective planetary pinions 7 and $7^a$, engaging on the one hand a central gear wheel 8 and $8^a$ and on the other hand the internal toothed wheel 3. The central wheels 8—$8^a$ are secured to the respective disks 9—$9^a$, which may adhere magnetically to the stationary electro-magnets 10—$10^a$ or to the rotatable electro-magnets 4—$4^a$, which are secured respectively to the driving shaft 1, and to the actuated shaft 2.

To obtain the reduced speed, the electro-magnets 4 and $10^a$ are energized. According to the action above specified, the internal toothed wheel 3 is actuated by direct drive, and by a reduced-speed action on the central wheel $8^a$ which is now held fast, there will be obtained on the spider $5^a$ and hence on the actuated shaft 2 a speed which is lower than that of the driving shaft 1, and in the same direction.

For the direct drive, the electro-magnets 4 and $4^a$ are energized. As above stated, the wheel 3 is actuated by direct drive, and this wheel, by means of the planetary pinions $7^a$, will drive the actuated shaft 2 at the same speed, that is, by direct drive.

An increased speed is obtained by energizing the electro-magnets 10 and $4^a$. As in the case of Figure 2, the wheel 3 will now be rotated at a greater speed than the shaft 1 and in the same direction, and said wheel drives, at its own speed, the actuated shaft 2 which thus turns at a higher speed than that of the driving shaft 1 and in the same direction.

In this construction, it is further possible to obtain a speed other than the direct drive, by energizing the electro-magnets 10—$10^a$. The electro-magnet 10 affords on the wheel 3 a greater speed than that of the driving shaft 1 and in the same direction, and the electro-magnet $10^a$ provides upon the actuated shaft 2 a less speed than that of the wheel 3 and in the same direction. It is thus observed that when the speed-reducing device and the speed-increasing device act at the same time, the result will be a speed in the same direction as that of the driving shaft, and somewhat above or below this latter, according to the preponderance of the speed-reducing or the speed-increasing device.

In the cases in which the aforesaid apparatus is to operate for a considerable time upon a given speed combination, which is most frequently the direct drive, the invention comprises a device indicated diagrammatically in Figures 3, 4, 5 and 6, in which the parts are driven and stopped by mechanical means. By this arrangement, a saving of the electric current is afforded.

For this purpose the armature has on the periphery equally-spaced notches in which are slidable suitable keys 14 in such manner that the keys may project from either side of the armature 9. In the middle position, the said keys are somewhat back of the respective sides of the armature. When the said keys are laterally displaced, their projecting ends will be engaged in notches 15 formed in the electro-magnets 4 and 10. The said keys 14 are controlled in a suitable manner by a ring 16 which is centered, by easy friction, on the exterior of the armature 9 and has an annular groove in which is loosely engaged a stud 17. The said ring which rotates together with the armature 9 can be readily moved laterally by the stud 17, operating under a suitable control, and it thus draws with it the said keys 14. The armature 9 is provided with fastening means for determining the positions of each key, by the action of balls 18 which are urged by springs 19 and engage in recesses 20—21—22.

The operation is as follows: With the driving shaft rotating at slow speed in the apparatus shown in Figure 3, for example, if it is desired to obtain the direct drive, the stud 17 is moved to the left and it actuates the ring 16 which pushes the keys 14 into the notches 15 of the electro-magnet 4.

During this displacement, the balls 18 are released from the recesses 21 and are engaged in the recesses 22, thus holding the keys in their new position. The electro-magnet 4 and the armature 9 are thus secured together, by mechanical means, thus providing for the direct drive between the driving shaft 1 and the actuated shaft 2.

In these various apparatus, the current is supplied to the electro-magnets by a controller of a known type, which is operated by a handle, and this will occupy positions corresponding to the different speeds and to the idle position.

In practice, it may happen that when the driving shaft is stopped, the handle has not been brought to the idle position, so that the circuit will not be broken. To obviate this defect, the invention comprises an automatic opening of the circuit; which may be effected by different means.

Upon motor vehicles, for instance, the apparatus may comprise a circuit-breaker of a known type which is actuated by oil pressure or by the vacuum due to the suction. As a general rule, the apparatus may also comprise a centrifugal device as shown by way of example in Figs. 3 and 7.

In this construction, the driving shaft 1 carries a conducting ring 23 supplied with current by a brush 24. Said ring is insulated from the driving shaft. The current is supplied by a wire 25 to a resistance wire 26 wound in helical form and held in a tubular socket 27 of insulating material, which is radially disposed and is preferably secured to the driving shaft 1. A friction member 28 is slidable by easy friction in the cylinder formed by the resistance wire, and it is urged towards the driving shaft by calibrated spring 30. At the centre of said friction member is disposed a conducting rod 31 whose outer end 32 is connected to one or more wires leading to the coils of the said electro-magnets.

The operation is as follows: When the shaft 1 rotates at normal speed, the friction member 28 is urged by the centrifugal force and is thus situated at the end 32 of the rod 31. The current then flows directly from the said conducting ring through the friction member 28 and the rod 31 to the electro-magnets. If the speed of the driving shaft diminishes below a given point, corresponding for instance to the minimum speed employed, the force of the spring 30 will prevail over the centrifugal force acting on said friction member, and it will move towards the driving shaft. Thus a certain number of the turns of the spiral resistance wire will carry the current flowing from the wire 25 to the rod 31, so that the current will be reduced by this inserted resistance whose value is greater as the speed of the driving shaft is slower. The current in the electro-magnets and hence their entraining power will vary in the same direction, thus affording a slip which allows a progressive coupling between the driving parts and the actuated parts.

If the driving shaft 1 operates at a still slower speed, or is stopped, the friction member 28 attains the bottom of its stroke towards the driving shaft, and herein it is out of contact with the resistance spiral 26, thus breaking the circuit.

The said device thus provides for a progressive coupling, and the driving shaft will not be stopped when at slow speeds; the circuit is automatically broken when the driving shaft stops.

The various embodiments of the invention which are given by way of example, are so arranged as to be preferably adapted for use upon driving apparatus which is already provided with change-speed gear. The said devices can also be employed in other cases, and for instance for driving devices for machine tools, for operating the propellers of vessels or aircraft, or the like, and in general, for all power transmission devices in which the direct drive and adjacent speeds are to be obtained in a ready and a noiseless manner.

Having now described my invention what I claim as new and desire to secure by Letters Patent is:

1. A speed changing device comprising a combination a driving shaft, a driven shaft, an internal toothed wheel, and with each of said shafts an electromagnet secured on said shaft, a set of planetary wheels rigidly connected with the corresponding shaft and constantly in meshing engagement with said internal toothed wheel, a central loose gear wheel constantly in meshing engagement with the corresponding set of planetary wheels and provided with an armature adapted to be engaged by said electromagnet of the corresponding shaft, a stationary electromagnet on which the armature of the corresponding shaft is adapted to be engaged and means for adjusting the position of said stationary electromagnets towards and away from the corresponding armature.

2. In a speed changing device, in combination a rotatable shaft, an annular electromagnet secured on said shaft and provided with notches at its periphery, a central loose gear wheel provided with an armature having slots at its periphery and adapted to be engaged by said electromagnet, a stationary electromagnet on which said armature is adapted to be engaged and also provided with notches at its periphery, keys adapted to slide in the slots of said armature and to engage and disengage the notches in either of the two annular electromagnets, a ring connecting together said keys and means adapted to move said ring towards either side of said intermediate annular armature.

3. In a speed changing device in combination a rotatable shaft, an annular member secured on said shaft and provided with notches at its periphery, a stationary annular member also provided with notches at its periphery, a central loose gear wheel provided with an intermediate annular member disposed between said two first mentioned annular members and having slots at its periphery, keys adapted to slide in the slots of said intermediate member and adapted to engage and disengage the notches in either of the two first mentioned annular members, one key at least being provided on its inner face with three recesses, a yielding push-piece with a rounded head carried in said intermediate annular member and adapted to engage either of said recesses, a ring connecting together said keys, and means adapted to move said ring towards either side of said intermediate annular member.

4. A speed changing device comprising in combination a driving shaft, a driven shaft, an internal toothed wheel, means for operatively connecting said internal toothed wheel with the driven shaft, a set of planetary wheels rigidly connected with the driving shaft and constantly in meshing engagement with said internal toothed wheel, a central loose gear wheel constantly in meshing engagement with said set of planetary wheels, a rotatable annular electro-magnet secured on said driving shaft, a stationary annular electro-magnet opposite said rotatable annular electro-magnet, an intermediate armature secured to said central loose gear wheel, disposed between said two annular electro-magnets and adapted to engage said electro-magnets, means for leading electric-current to said rotatable electro-magnet, a switch interposed in said leading means for the current and means for opening automatically said switch when said driving shaft is stopped.

5. A speed changing device comprising in combination a driving shaft, a driven shaft, an internal toothed wheel, means for operatively connecting said internal toothed wheel with the driven shaft, a set of planetary wheels rigidly connected with the driving shaft and constantly in meshing engagement with said internal toothed wheel, a central loose gear wheel constantly in meshing engagement with said set of planetary wheels, a rotatable annular electro-magnet secured on said driving shaft, a stationary annular electro-magnet opposite said rotatable annular electro-magnet, an intermediate armature secured to said central loose gear wheel, disposed between said two annular electro-magnets and adapted to engage said electro-magnets, means for leading electric current to said rotatable electro-magnet and a switch interposed between two portions of said leading means for the current and having radial guiding means connected with one portion of said leading means and secured on said driving shaft, a slide adapted to move along said guiding means, a spring adapted to urge said slide towards said driving shaft and a contact member connected with the other portion of said leading means and adapted to be engaged by said slide in its outermost position.

6. A speed changing device comprising in combination a driving shaft, a driven shaft, an internal toothed wheel, means for operatively connecting said internal toothed wheel with the driven shaft, a set of planetary wheels rigidly connected with the driving shaft and constantly in meshing engagement with said internal toothed wheel, a central loose gear wheel constantly in meshing engagement with said set of planetary wheels, a rotatable annular electro-magnet secured on said driving shaft, a stationary annular electro-magnet opposite said rotatable annular electro-magnet, an intermediate armature secured to said central loose gear wheel, disposed between said two annular electro-magnets and adapted to engage said electro-magnets, means for leading electric current to said rotatable electro-magnet and a switch interposed between two portions of said leading means for the current and having radial guiding means connected with one portion of said leading means and secured on said driving shaft, a slide adapted to move along said guiding means between two extreme positions, a spring adapted to urge said slide towards said driving shaft, a contact member connected with the other portion of said leading means and adapted to be engaged by said slide in its outermost position and an electric resistance connected with said contact member, wound around said guiding means and adapted to be engaged at different points by said slide.

7. A speed changing device comprising in combination a driving shaft, a driven shaft, an internal toothed wheel, and with each of said shafts an electromagnet secured on said shaft, a set of planetary wheels constantly in meshing engagement with said internal toothed wheel, means between said sets of planetary wheels for connecting rigidly each set of planetary wheels with its corresponding shaft, a central loose gear wheel constantly in meshing engagement with the corresponding set of planetary wheels and provided with a carrier extending between said corresponding set of planetary wheels and the corresponding armature and provided also with an armature on said carrier adapted to be engaged by said electromagnet of the corresponding shaft and a stationary electromagnet on which the armature of the corresponding shaft is adapted to be engaged.

In testimony whereof I have signed my name to this specification.

JEAN COTAL.